United States Patent [19]

Baumard et al.

[11] Patent Number: 4,468,597
[45] Date of Patent: Aug. 28, 1984

[54] METHOD FOR REGULATING THE POWER SUPPLY TO A DIRECT-CURRENT MOTOR AND A DEVICE FOR THE APPLICATION OF SAID METHOD

[75] Inventors: René Baumard, Azay sur Cher; André Erckelboudt, Montlouis sur Loire; Bernard Moulin, Montlouis sur Loire; Rémi Robin, Montlouis sur Loire, all of France

[73] Assignee: Faiveley S.A., Saint-Ouen-Cedex, France

[21] Appl. No.: 342,192

[22] Filed: Jan. 22, 1982

[30] Foreign Application Priority Data

Feb. 11, 1981 [FR] France ................... 81 02639

[51] Int. Cl.³ .............................................. G05B 5/00
[52] U.S. Cl. ................................. 318/317; 318/315; 318/331; 318/455; 318/458
[58] Field of Search ............... 318/266, 308, 317, 315, 318/336, 345 B, 345 C, 345 CA, 345 F, 344, 469, 455, 458, 331; 361/33, 23, 30, 31, 54, 56, 57, 65, 79, 90

[56] References Cited

U.S. PATENT DOCUMENTS

| | | | |
|---|---|---|---|
| 3,230,440 | 1/1966 | Kleiner | 361/90 X |
| 3,432,726 | 3/1969 | Meyer et al. | 361/79 |
| 3,443,189 | 5/1969 | Gilbreath | 318/345 C |
| 3,538,426 | 11/1970 | Jones | 361/57 X |
| 3,694,720 | 9/1972 | Nakajima | 318/308 |
| 3,727,103 | 4/1973 | Finch et al. | 361/30 |
| 4,180,768 | 12/1979 | Ferraro | 361/79 X |

*Primary Examiner*—Ulysses Weldon
*Attorney, Agent, or Firm*—Young & Thompson

[57] ABSTRACT

The power supply to an electric actuating motor is regulated by reducing the differences between current intensity or voltage and a reference value. Two transducers measure the current intensity and the voltage. A selection stage chooses the higher of the two values and a comparison stage delivers a difference signal with respect to the reference value established by a stage of the potentiometer type. A regulator produces an action which is compared within a comparator with a sawtooth signal emitted by an oscillator. Depending on the sign of the comparison, a control stage supplies the motor during a variable fraction of the period of the oscillations.

3 Claims, 9 Drawing Figures

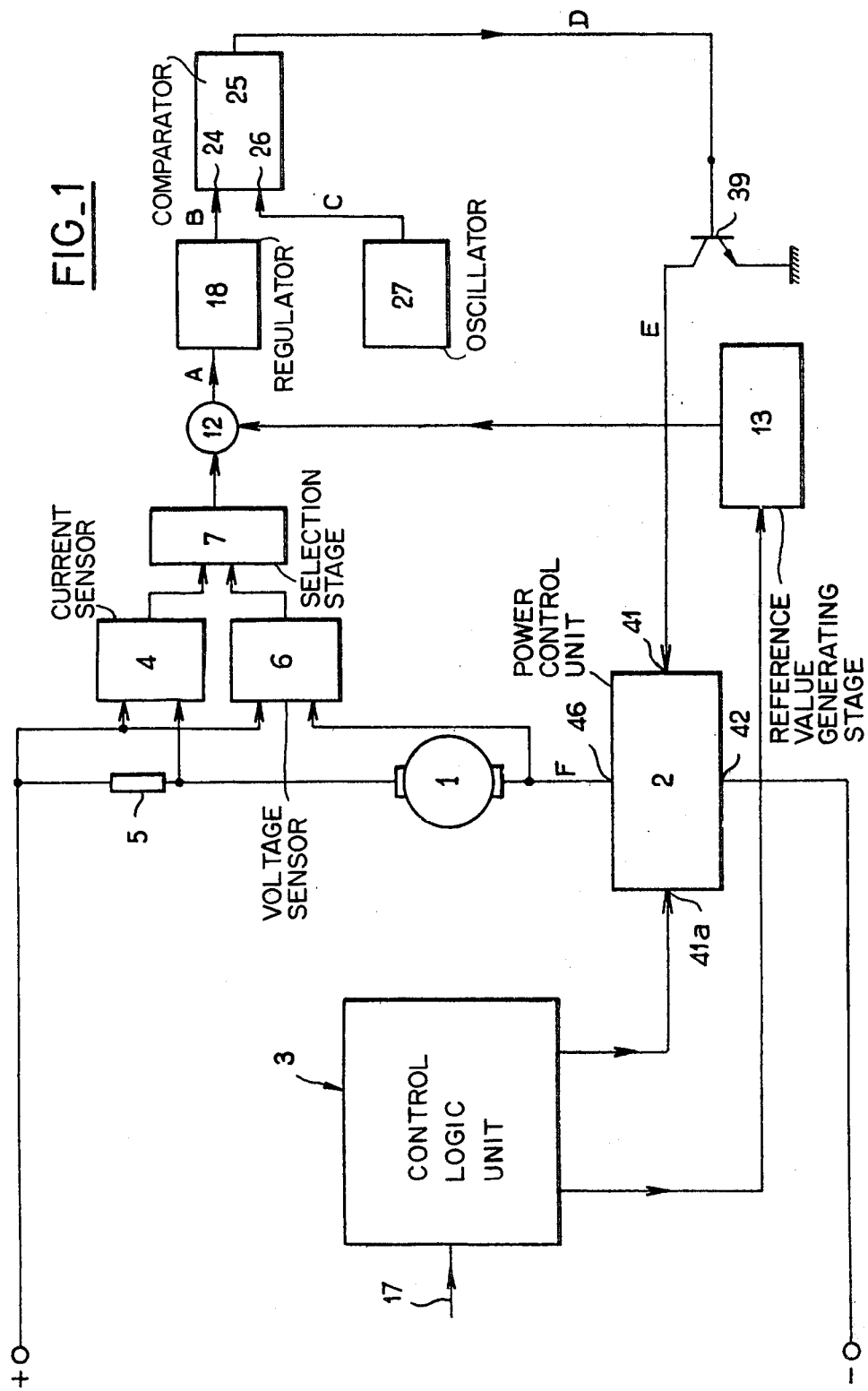

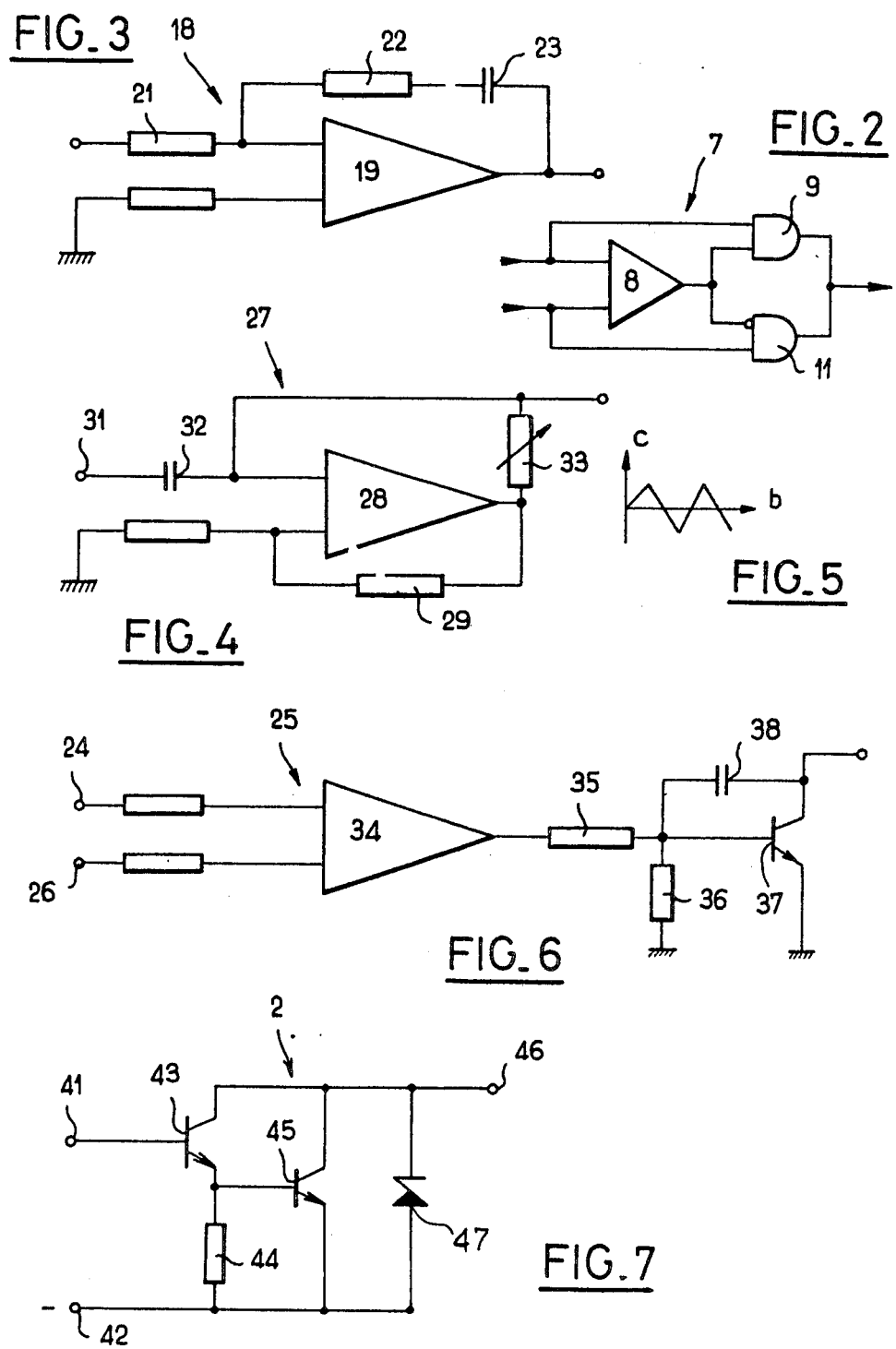

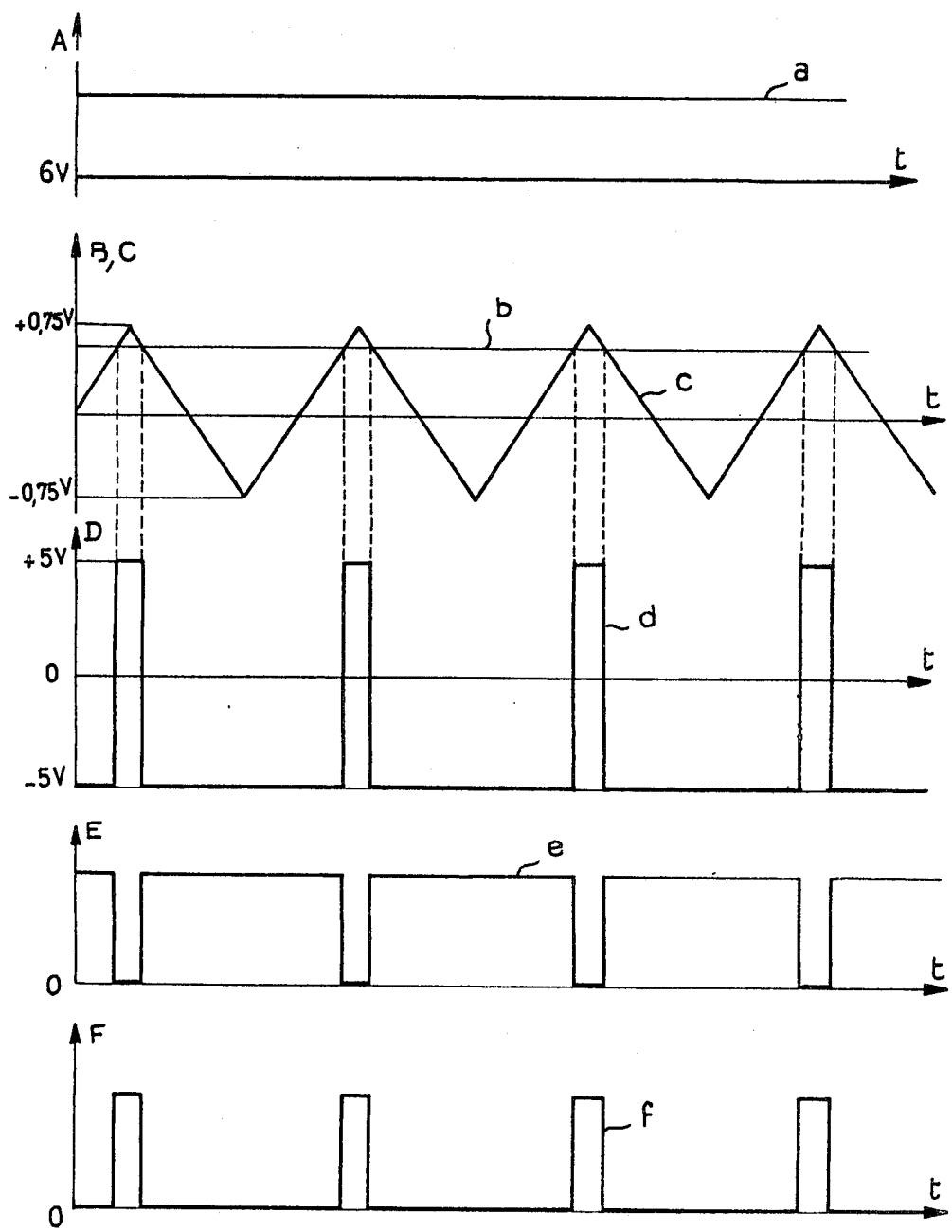
FIG_8

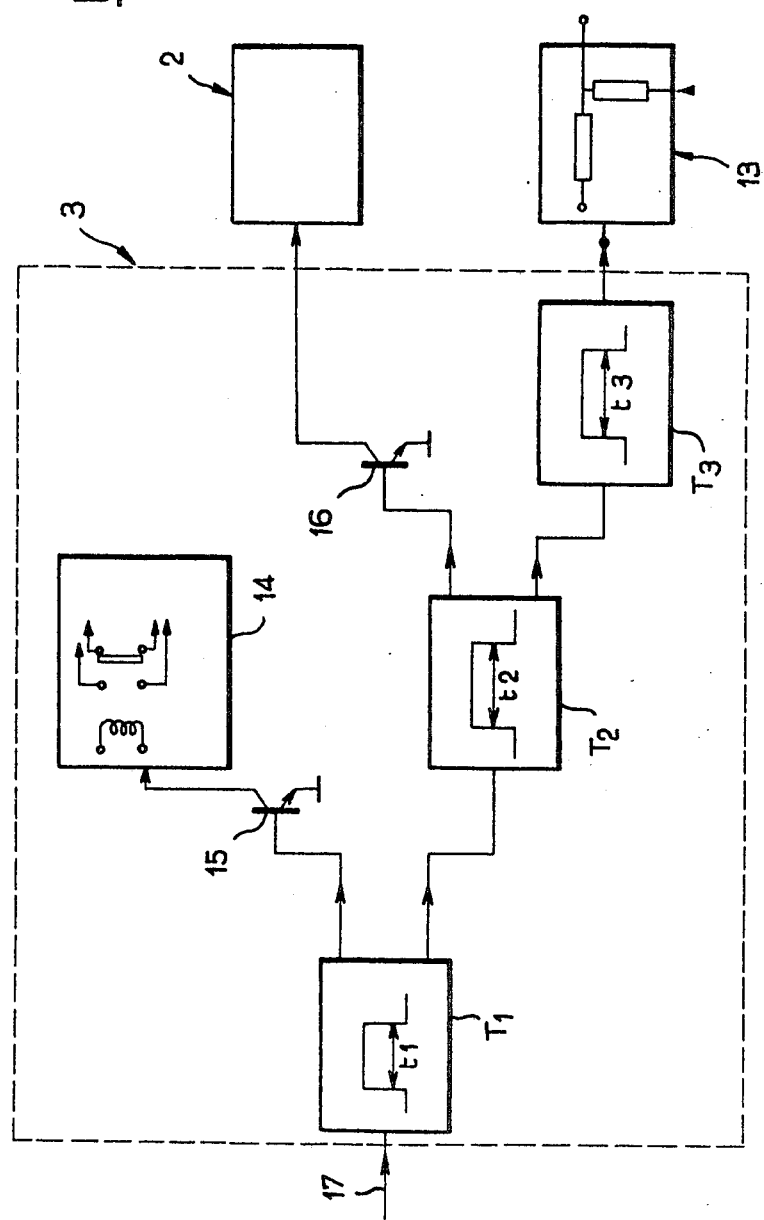
FIG_9

METHOD FOR REGULATING THE POWER SUPPLY TO A DIRECT-CURRENT MOTOR AND A DEVICE FOR THE APPLICATION OF SAID METHOD

This invention relates to a method for regulating the current intensity and voltage applied to a direct-current electric motor with respect to a predetermined reference value by modifying the power supply to the motor.

The invention further relates to a device for carrying out said method.

It is known that the speed of a motor of this type is dependent on the supply voltage and that the torque exerted by the motor is dependent on the current intensity. In the case which is primarily contemplated by the invention and in which the motor transmits motion by means of a suitable reduction gear system in order to carry out the displacement of a mechanical element such as a door, a machine-tool component or the carriage of a handling appliance, a double problem becomes apparent.

In the first place, it is necessary to ensure that the operation takes place without jerks, essentially at the end of travel. In the second place, locking at the end of travel must not give rise to current overload within the motor.

In order to solve this problem of double control, it is a known practice to employ a double control loop in a closed chain in which one loop makes use of a current intensity comparator and in which the other loop makes use of a voltage comparator. In order to ensure efficient regulation of the speed of the motor, the control chain comprises a tacho-dynamo keyed on the drive shaft of the motor.

This constructional design results in excessive weight as well as particularly high capital outlay.

The aim of the present invention is to provide a method of double control which is carried out by means of a particularly simple structure.

This result is obtained in accordance with the invention by performing the following operations:

(a) the voltage and current intensity are converted in accordance with the same scale of a representative quantity;
(b) the two converted quantities are compared with each other and the larger quantity is retained;
(c) the value retained is compared with the reference value in order to define a difference signal for controlling a supply regulator.

This arrangement permits the use of a single control chain in which the quantity to be controlled is either the current intensity or the voltage, selection being performed by comparison of these two quantities with each other after they have been converted in accordance with the same scale of a representative auxiliary quantity.

According to another aspect of the invention, the device for regulating the current intensity and voltage applied to a direct-current electric motor comprises a regulator having proportional and integral action for controlling a power control stage, and a stage which serves to produce a reference value and is connected to the regulator through a comparison stage. The invention essentially comprises two transducer-type sensors for measuring respectively the supply current intensity and voltage and converting them to signals in accordance with the same scale of a representative quantity, and a comparison and switching stage for selecting the signal having the highest value, the output of said stage being connected to the stage for comparison with the reference value.

Other features of the invention will be more apparent upon consideration of the following description and accompanying drawings, wherein:

FIG. 1 is a general diagram of a regulating device according to the invention;
FIG. 2 is a detailed diagram of the comparison and switching stage;
FIG. 3 is a detailed diagram of the regulator;
FIG. 4 is a detailed diagram of the oscillator;
FIG. 5 is a diagram showing the signal emitted by the oscillator;
FIG. 6 is a diagram of the comparator;
FIG. 7 is a detailed diagram of the power control stage;
FIG. 8 is a waveform diagram which serves to explain the operation of the device;
FIG. 9 is a detailed diagram of the control logic unit.

Referring now to FIG. 1, a motor 1 is supplied through a power control stage 2, from a storage battery having positive and negative plates. Said power control stage is connected to a control logic unit 3 which will hereinafter be described in greater detail. A current intensity sensor 4 of the transducer type is mounted across the terminals of a resistor 5 in series with the motor 1 and a voltage sensor 6 of the transducer type is mounted across the terminals of the assembly consisting of the motor 1 and the resistor 5.

Said transducer-type sensors (hereinafter designated as transducers) are adapted to deliver at their output a voltage which is representative of the measured quantity in accordance with a scale of 6–12 V.

The outputs of the transducers are applied to the input of a comparison and selection stage 7 comprising a comparator 8 (as shown in FIG. 2) to which the two signals are applied. Said comparator delivers a "1" level signal if the intensity signal is of higher value than the voltage signal and a "0" level signal if this is not the case. The output of the comparator 8 is connected in parallel to one input of an AND-gate 9 to which the intensity signal is also applied and to a reversing input of an AND-gate 11 to which the voltage signal is also applied. The outputs of said gates are connected in parallel so as to constitute the output of the stage 7.

It is apparent that the output signal of the stage 7 corresponds to one of the two input signals, namely the signal which has the higher value.

Said output signal is applied to one input of a comparison stage 12, another input of which is connected to a reference-value generating stage 13 of the potentiometer type which is in turn connected to the control logic unit 3.

The control logic unit 3 comprises a first timing stage T1 to which is applied a signal 17 produced by the position of the mechanical element displaced by the motor 1. Said stage T1 drives in parallel a stage 14 for defining the direction of rotation of the motor 1 (by means of a transistor 15) and a second timing stage T2. The stage T2 drives in parallel one input 41a of the power control stage 2 (by means of a transistor 16), and a third timing stage T3, the output of which drives the reference-value generating stage 13. Said stage 13 comprises a potentiometer circuit assembly which is supplied at 6 V in order to define the reference value in accordance with a scale of 6–12 V.

The output of the comparison stage 12 (which is in fact a subtracting circuit) is connected to the input of a regulator 18 having proportional and integral action in order to apply to this latter a difference signal A, said signal being always defined by a voltage which varies between 6 and 12 V (see curve a in FIG. 8).

The regulator 18 comprises an amplifier 19 which is driven by means of a resistor 21 and comprises a negative feedback loop composed of a resistor 22 in series with a capacitor 23.

The output signal B of the regulator is proportional to the difference signal as a result of the action of the resistors 21, 22 in order to provide immediate attenuation of any fast variations in the quantity to be regulated. By virtue of the capacitor 23, there is superimposed on said signal an action which is proportional to the integral of the difference with respect to time, which tends to correct slow variations.

The regulator 18 is constructed in such a manner as to deliver an output signal which varies between −0.75 V and +0.75 V when the difference signal varies between its extreme limits.

The output of the regulator 18 is connected to one input 24 of a comparator 25, the other input 26 of which is connected to the output of an oscillator 27.

Said oscillator comprises an amplifier 28 (as shown in FIG. 4), the output of which is connected to the reference input through a negative feedback loop comprising a resistor 29. The signal input 31 is connected to the other input of the amplifier via a capacitor 32 and the output of the amplifier is connected to said input via a variable resistor 33. The output signal is collected between the input of the amplifier and the variable resistor 33.

By means of this arrangement, a sawtooth signal C is obtained at the output of the oscillator, as shown in FIG. 5. In the example herein described, the amplitude of this signal is ±0.75 V (see curve c in FIG. 8) and the frequency of said signal is 1 kHz.

The comparator 25 (shown in FIG. 6) comprises an amplifier 34, the output of which is coupled in parallel via a voltage divider composed of two resistors 35, 36 to the base of a transistor 37 mounted with a common-emitter connection and to the collector of said transistor via a capacitor 38. This arrangement serves to obtain at the output a signal D of 5 V which is either positive or negative, depending on whether the sawtooth signal C is respectively higher or lower than the output signal B of the regulator 18 (see curve d in FIG. 8).

Said signal is applied to the base of a transistor 39 which is mounted with a common-emitter connection and delivers on its collector an inverted and rectified signal E (see curve e in FIG. 8).

The signal E is applied to one input 41 of the power control stage 2, the other input 42 of which is connected to the negative pole of the battery.

The input 41 is connected to the base of a transistor 43, the emitter of which is connected on the one hand to the negative branch via a resistor 44 and on the other hand to the base of a transistor 45, the emitter of which is connected to said negative branch. The collectors of the two transistors are connected to the output 46 of the stage 2 and a Zener diode 47 connects said output to the negative branch.

This circuit arrangement makes it possible to obtain at the output a chopped voltage waveform F (see curve f in FIG. 8) which serves to supply the motor. In actual fact, the input 41 is the same as the input 41a on which are therefore superimposed the signal emitted by the control logic unit 3 and the chopped signal E.

In the example herein described, the device makes it possible by wave-chopping to supply the motor 1 in normal operation at maximum speed and at a voltage of 57 V from a 72-volt battery.

In operation, the motor 1 is started-up by means of the logic control unit 3. After a time interval $t_1$ defined by the stage T1, the direction of rotation of the motor is defined by the stage 14. Then, after a further time interval $t_2$ defined by the stage T2, the power control stage 2 is excited. After a final time interval $t_3$ defined by the stage T3, the reference value is generated.

During operation of the motor, if the current intensity were to increase as a result of locking, for example, the comparison and switching stage 7 selects this value as the quantity to be regulated and the comparison stage 12 delivers the difference signal A. The regulator 18 delivers an action B which is greater as the difference signal is of higher value. As this action B is stronger, so the period during which it is lower than the sawtooth signal is shorter (as shown in FIG. 8). This has the effect of reducing the time-duration of the pulses of the signal D and finally of reducing the periods of current flow within the motor with respect to the periods of current interruption.

The controlled variable or regulated quantity can also be the voltage applied to the motor. In particular, when the mechanical element displaced by the motor comes close to its end of travel, the signal 17 applied to the remote-control unit has the effect of reducing the reference value and the regulator produces action which tends to reduce the voltage applied to the motor and therefore to reduce the speed of the motor.

It will readily be apparent that the invention is not limited to the example hereinbefore described but extends to any alternative arrangement within the capacity of anyone versed in the art, especially in regard to the arrangement of the electric circuits.

What is claimed is:

1. A method for regulating the current intensity and voltage applied to a direct-current electric motor with respect to a predetermined reference value by modifying the power supply to the motor, comprising the following steps:
   (a) separately converting into converted quantities the voltage at the terminals of said electric motor and the current intensity within said electric motor in accordance with the same scale of a representative quantity;
   (b) comparing said converted quantities with each other and retaining the larger one;
   (c) comparing the retained quantity with a reference value and producing a difference signal,
   (d) controlling a supply regulator by means of said difference signal for generating a supply signal,
   (e) supplying said electric motor with said supply signal,
   (f) generating oscillation signals, and
   (g) comparing said oscillation signals with said supply signal and generating a chopped supply signal supplied to said electric motor.

2. A device for regulating the current intensity and voltage applied to a direct-current electric motor comprising: two transducer-type sensors for separately converting the supply current intensity and voltage into converted quantities in accordance with the same scale of a representative quantity, first comparator means connected to said transducer type sensors for comparing said converted quantities and selecting the larger one, reference means for generating a reference value of said representative quantity, second comparator means connected to said first comparator means and said reference means for comparing said larger converted quantity with said reference value and producing a difference signal, supply regulator means connected to said second comparator means, power control means connected to said supply regulator for supplying said electric motor, a generator for producing oscillations, and third comparator means having inputs connected to said supply regulator and said generator and an output connected to said power control means whereby a chopped signal is supplied to said power control means.

3. A device according to claim 2 wherein said generator is adapted to generate saw tooth oscillations.

* * * * *